United States Patent
Seidl

(10) Patent No.: US 6,719,912 B2
(45) Date of Patent: Apr. 13, 2004

(54) BAR SCREEN SYSTEM WITH EMERGENCY DISCHARGE DOORS

(75) Inventor: Gerald Seidl, Houston, TX (US)

(73) Assignee: Headworks, Inc., Houston, TX (US)

( * ) Notice: Subject to any disclaimer, the term of this patent is extended or adjusted under 35 U.S.C. 154(b) by 79 days.

(21) Appl. No.: 10/081,103

(22) Filed: Feb. 21, 2002

(65) Prior Publication Data

US 2002/0113026 A1 Aug. 22, 2002

Related U.S. Application Data

(60) Provisional application No. 60/270,475, filed on Feb. 21, 2001.

(51) Int. Cl.⁷ .............................................. B01D 37/00
(52) U.S. Cl. ..................... 210/790; 210/791; 210/159; 210/162; 210/434
(58) Field of Search ................................ 210/130, 154, 210/159, 162, 170, 473, 414, 433.1, 434, 790, 791

(56) References Cited

U.S. PATENT DOCUMENTS

| | | | | |
|---|---|---|---|---|
| 2,106,851 A | * | 2/1938 | Nordell | 210/434 |
| 5,032,263 A | * | 7/1991 | Rudzinski | 210/162 |
| 5,167,803 A | * | 12/1992 | Newton et al. | 210/159 |
| 5,405,539 A | * | 4/1995 | Schneider | 210/434 |
| 5,489,378 A | * | 2/1996 | Cheesman et al. | 210/433.1 |
| 5,565,093 A | | 10/1996 | Frankenberger | 210/158 |
| 5,571,406 A | * | 11/1996 | Mensching | 210/159 |
| 5,730,862 A | | 3/1998 | Mahr | 210/159 |

* cited by examiner

*Primary Examiner*—Christopher Upton
(74) *Attorney, Agent, or Firm*—Bracewell & Patterson, L.L.P.

(57) ABSTRACT

A screen system used in fluid channels has emergency discharge doors. The emergency discharge doors are located within the debris plate of the bar screen system and can be opened, as needed, to prevent fluid from overflowing should the grid screen become obstructed. The emergency discharge doors are located within rectangular openings in the debris plate in which the doors sit flush with the debris plate when closed. The emergency discharge doors can be opened manually, when needed, with handles that are preferably located at the top of the screen system. Lifting the handles releases the locking pins that keep the doors in place, allowing the doors to open freely in response to the fluid pressure on the upstream side of the screen system.

13 Claims, 3 Drawing Sheets

BAR SCREEN SYSTEM WITH EMERGENCY DISCHARGE DOORS

RELATED APPLICATIONS

This application claims the benefit of provisional patent application, U.S. Ser. No. 60/270,475 filed on Feb. 21, 2001.

BACKGROUND OF THE INVENTION

1. Technical Field of the Invention

This invention relates to screen systems located in fluid conduits such as waste water treatment streams, power plants, sewers, and cooling water streams. More particularly, this invention refers to a bar screen system with emergency discharge doors to prevent the fluid from overflowing should the grid screen become obstructed.

2. Description of the Prior Art

Bar screens are used for screening solids and debris from flowing liquids streams. An example of such a bar screen system can be found in U.S. Pat. No. 5,730,862 issued to Mahr. In such systems, the bar screen typically comprises a series of rakes that pass over a series of parallel screen bars, which make up a grid screen, and removes the debris collected from the flowing stream. Occasionally, large pieces of debris can block the grid screen and cause fluid to flow over the top of the screen system and the banks of the channel in which the screen system is installed.

Systems, such as the screen in the Mahr Patent, have tried to deal with the problem by using nozzles to spray the debris off of the rakes and grid screen or either reversing the direction of travel for the rakes until the impediment has been removed from the grid screen. However, these attempts are not always successful at clearing the grid screen enough to continue operation of the screen system, especially when the debris is relatively large in size.

A need exists for a screen system that will prevent fluid from flowing over the screen system and channel banks in the event of blockage in the grid screen. Ideally, such a system should be capable of being adapted to the specific fluid applications and also be able to be used on existing screen system equipment with minimal modification.

SUMMARY OF THE INVENTION

This invention provides a novel apparatus and method for preventing fluid from flowing over the top of a bar screen system. Debris and other solids can obstruct the fluid flow through the bar screen system. The bar screen system of the present invention is equipped with emergency discharge doors to prevent fluid from overflowing should the grid screen become obstructed.

The invention generally comprises a screen frame, which has a front edge and a rear edge. The rear edge is attached to a debris plate and a grid screen, which is located below the debris plate. The grid screen comprises a plurality of vertical, flat bars and a plurality of rakes that contain fingers that fit between the vertical, flat bars and clean off debris. The rakes are attached to chains on both rake ends in order for the rakes to travel over the distance of the screen system. The chains are driven by a motor.

The improvement to the screen systems of prior art is the inclusion of emergency discharge doors located on the debris plate above the grid screen. The emergency discharge doors can be manually or remotely opened with handles. The emergency discharge doors can also include a mechanism, which is described in greater detail below, to free the doors to where they can fall freely due to the weight of the water. The doors are needed when there is an obstruction in the grid screen that the rakes cannot clear and causes a blockage in the fluid flow. Since the fluid cannot pass through the grid screen, the fluid builds up in front of the grid screen and debris plate. If the debris is not removed from the grid screen, then the fluid will eventually flow over the top of the screen and sides of the fluid channel.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

DETAILED DESCRIPTION OF THE DRAWINGS

Figure 1:
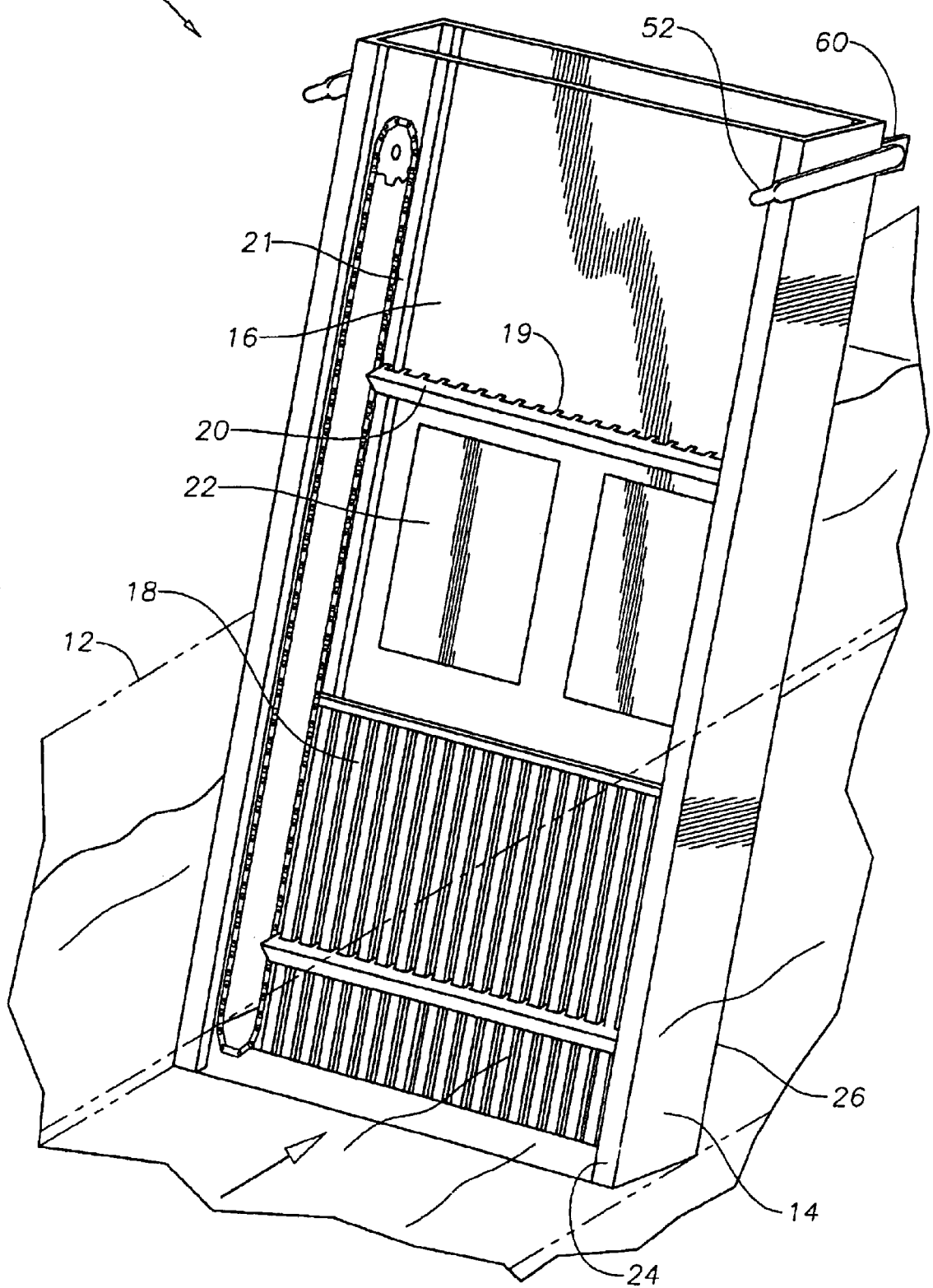
FIG. 1 is a perspective drawing of a screen system of the invention disposed in a liquid flow stream.

FIG. 1 illustrates a screen system 10, constructed in accordance with the invention, installed in a channel 12 through which a liquid flow stream passes in the direction indicated by the arrow. Channel 12 can be any fluid stream that needs so to be filtered. Examples include waste water treatment streams, power plants, sewers, and cooling water streams. Other streams will be known by those skilled in the art.

Screen system 10 generally comprises a screen frame 14, a debris plate 16 for preventing debris from passing over the top of the screen system 10, a grid screen 18 for collecting solid waste in the flow stream, a plurality of rakes 20 for removing solids and debris from grid screen 18, and emergency discharge doors 22 for preventing liquid overflow should grid screen 18 become obstructed.

Screen frame 14 has a front edge 24 and a rear edge 26. When screen system 10 is installed in a channel 12, screen frame front edge 24 will be on the upstream side and screen frame rear edge 26 will be on the downstream side. The distance between screen frame front edge 24 and screen frame rear edge 26 defines the depth dimension of screen frame 14. Grid screen 18 and debris plate 16 are attached to screen frame rear edge 26, with grid screen 18 located immediately below debris plate 16.

Grid screen 18 comprises a plurality of evenly-spaced, vertical, flat bars. The bars are spaced to allow liquid to pass unimpeded, but to block the passage of debris or solids in the flow stream. These solids and debris accumulate on the front of grid screen 18. Each rake 20 has a series of castellations or fingers 19 that fit in the gaps between the bars of grid screen 18. Rakes 20 are attached at each end to an endless chain 21. Chain 21 carries rakes 20 in an upward direction over the front surface of grid screen 18. As each rake 20 travels upward along grid screen 18, fingers 19 clean the accumulated solids and debris from grid screen 18. The solids and debris are carried to the top of screen system 10 for disposal.

Debris plate 16 is a solid permeable flat member located in the same plane as grid screen 18. Emergency discharge doors 22 are installed in debris plate 16 above grid screen 18. Preferably the front side of each door 22 is flush with upstream side of debris plate 16 when door 22 is closed. Emergency discharge doors can be any type of door suitable for this type of fluid containing environment and will be known by those skilled in the art. Each door 22 fits closely within a rectangular aperture in debris plate 16.

Figure 2:
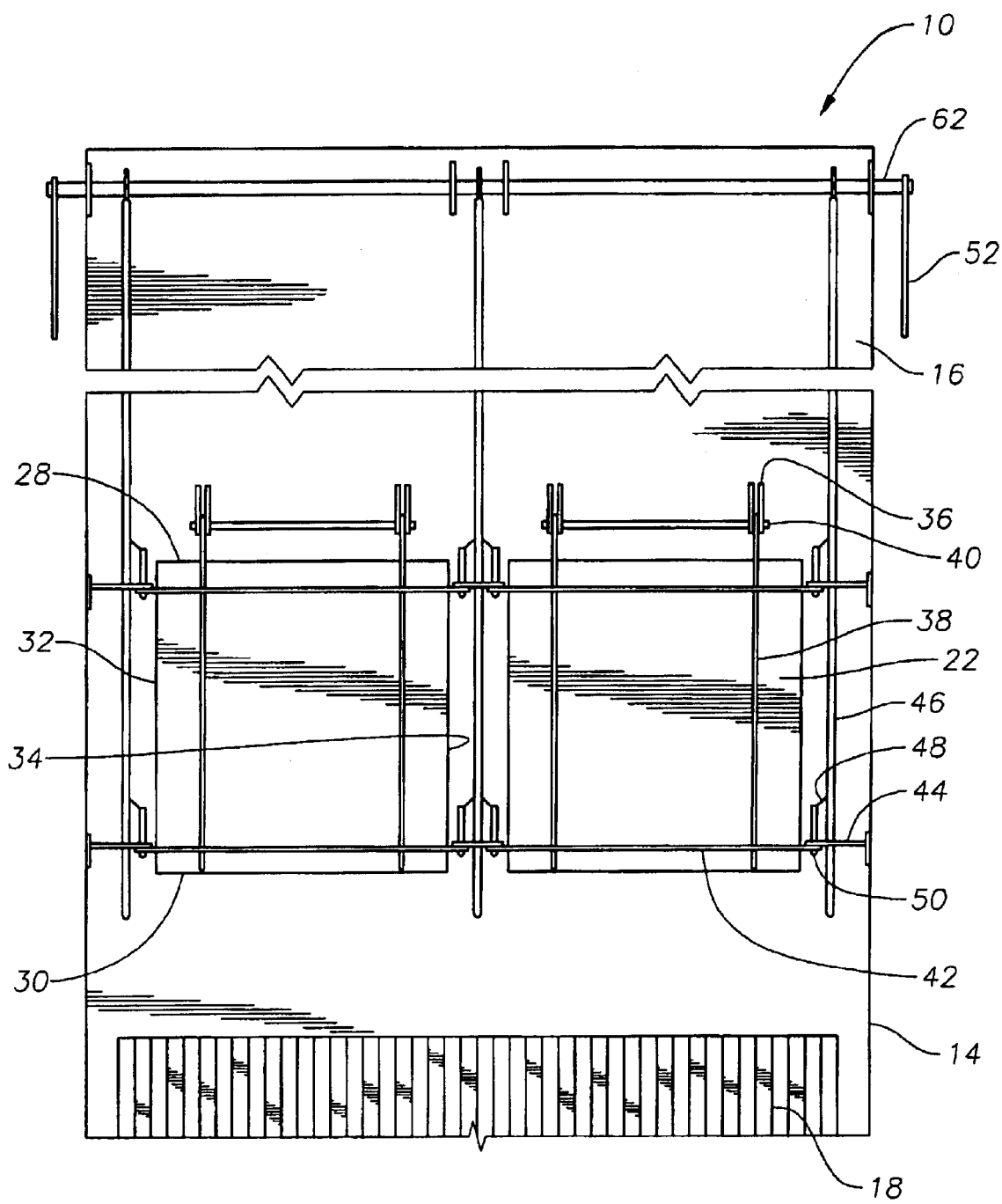
FIG. 2 is a back view of the upper portion of the invention of FIG. 1.
Figure 3:
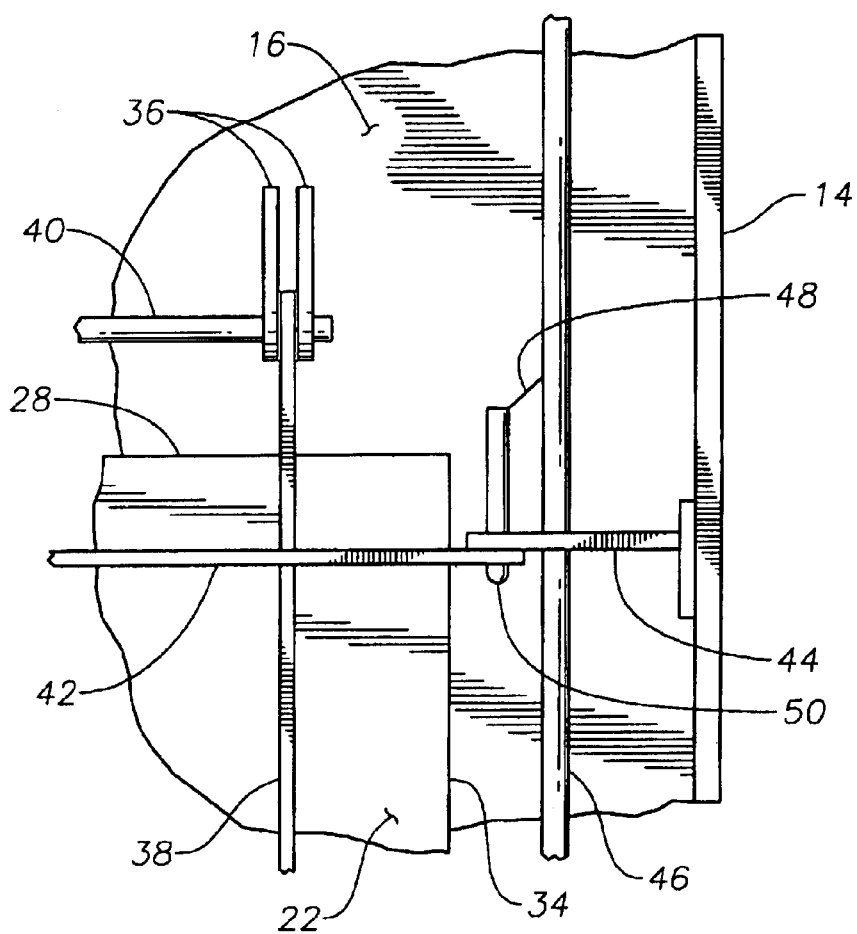
FIG. 3 is an enlarged back view of the invention of FIG. 1, showing the hinge assembly and the locking assembly in greater detail.

As shown in FIG. 2, rear side of door 22 has an upper edge 28, a lower edge 30, a left edge 32, and a right edge 34. Referring now to FIG. 3, the upper right corner of one door 22 is shown in greater detail. Two pairs of hinge brackets 36 are welded to debris plate 16 a selected distance above door upper edge 28. A vertical brace 38 is positioned between each pair of hinge brackets 36. Each vertical brace 38 extends from hinge bracket 36 down the vertical length of door 22, and is welded to the rear side of door 22. A hinge rod 40 passes horizontally through a hole (not shown) in each hinge bracket 36 and vertical brace 38, securing door 22 to debris plate 16.

Horizontal braces 42 are welded to rear side of door 22 at right angles to vertical braces 38. In the preferred embodiment of the invention, shown in FIG. 2, each door 22 has two horizontal braces 42; one near door upper edge 28 and one near door lower edge 30 (FIG. 2). Each horizontal brace 42 is wider than door 22, and extends a selected distance past door 22 on door left edge 32 and door right edge 34. Each horizontal brace 42 has a locking hole (not shown) near each end.

Referring again to FIG. 3, a locking bracket 44 is welded to debris plate 16 immediately adjacent to each end of each horizontal brace 42. Each locking bracket 44 extends away from door 22, parallel to horizontal brace 42. Each locking bracket 44 has a locking hole (not shown) which aligns with locking hole in horizontal brace 42 when door 22 is closed. Each locking bracket 44 also has an actuating rod hole (not shown) located a selected distance away from locking hole, further away from door 22.

An actuating rod 46 passes through the actuating rod hole in each locking bracket 44. Each actuating rod 46 extends from a point a selected distance below door lower edge 30 (FIG. 2) up to a point near the top of screen frame 14. Where actuating rod 46 meets each locking bracket 44, actuating rod 46 has a flange 48. Flange 48 is generally trapezoidal, and extends from actuating rod 46 towards door 22 in a plane parallel to debris plate 16. Welded to the end of flange 48 is locking pin 50. Locking pin 50 extends parallel to actuating rod 46, at a selected distance closer to door 22. The distance between locking pin 50 and actuating rod 46 is the same as the distance between actuating rod hole and locking hole in locking bracket 44. When locking pin 50 passes through locking holes in locking bracket 44 and horizontal brace 42, door 22 is locked in the closed position. As shown in FIG. 2, a locking bracket 44 is located on each side of each door 22.

Figure 4:
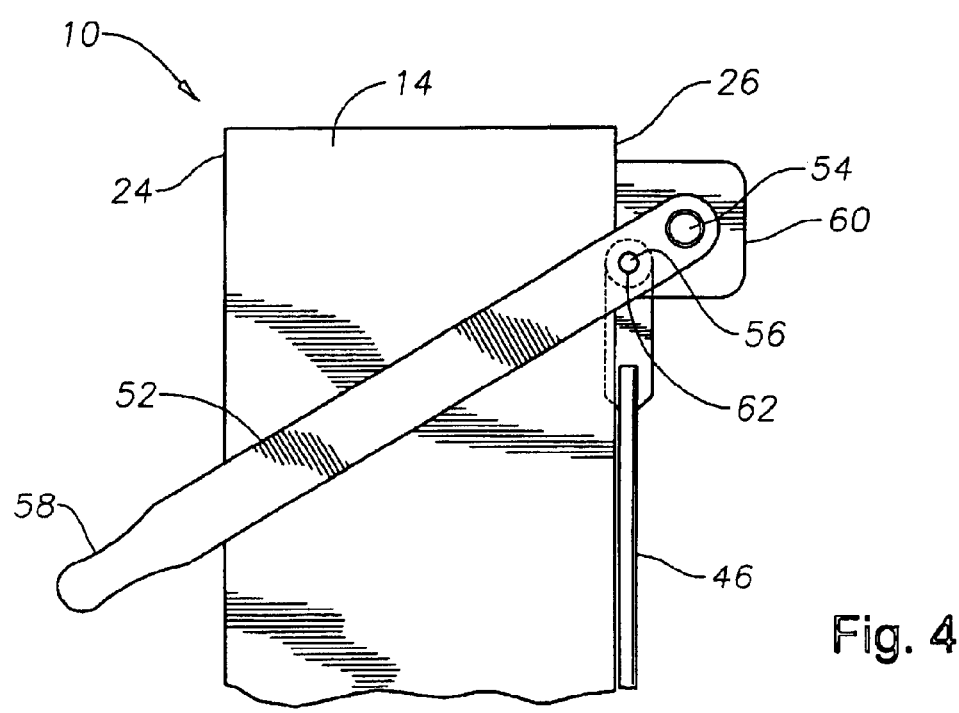
FIG. 4 is an enlarged side view of the invention of FIG. 1, showing the handle in greater detail.

Two handles 52 (FIG. 2) are located near the top of screen frame 14. As shown in FIG. 4, each handle 52 has a fulcrum point 54, an attachment point 56, and a grip 58. At fulcrum point 54, each handle 52 is attached to a handle support plate 60. Handle support plate 60 is a flat, rectangular plate welded to screen frame rear edge 26, and extending perpendicular to screen frame rear edge 26 in a downstream direction. Attachment point 56 is offset a selected distance from fulcrum point 54 in an upstream direction. At attachment point 56, handle 52 is attached to a horizontal handle bar 62. Handle bar 62 (FIG. 2) extends along the entire width of screen frame rear edge 26, connecting the two handles 52 together so that they will move in unison. Handle bar 62 passes through a hole (not shown) at the top of each of the three actuating rods 46. Handle 52 is longer than the depth dimension of screen frame 14, such that handle grip 58 extends past screen frame front edge 24 in an upstream direction. All three of the actuating rods 46 will move in unison.

In operation, screen system 10 is installed in a channel 12, usually slightly inclined from vertical. Grid screen 18 blocks the passage of solid material or debris in the fluid, while allowing the fluid to pass through. Rakes 20 travel in an upward direction along grid screen 18 and along debris plate 16, carrying solid material and debris towards the top of screen system 10 for disposal. Debris plate 16 prevents the passage of any solid material or debris past screen system 10 as rakes 20 push the debris upward. Debris plate 16 is located above the normal water level in channel 12.

Should the fluid flow through grid screen 18 become obstructed causing the normal water level to rise, emergency overflow doors 22 can be opened, preventing fluid from overflowing out of channel 12. To open doors 22, an operator manually lifts handle 52 using handle grip 58. When handle 52 is lifted, handle bar 62 also travels in an upward direction. Because each actuating rod 46 is attached to handle bar 62, each actuating rod 46 also moves upward in unison.

The upward motion of actuating rods 46 carries locking pins 50 upward. As each locking pin 50 moves upward, it disengages from locking hole in locking bracket 44. Once each locking pin 50 has fully disengaged from locking bracket 44, horizontal brace 42 is no longer held in alignment with locking bracket 44. Door 22 is now free to swing open in a rearward direction in response to the fluid pressure on the upstream side of screen system 10.

The invention has significant advances. The emergency discharge doors open the impermeable debris plate to allow fluid flow in case the water level rises too high. The mechanism for opening the doors is simple and quick to open.

While the invention has been shown or described in only some of its forms, it should be apparent to those skilled in the art that it is not so limited, but is susceptible to various changes without departing from the scope of the invention.

For example, various types of doors can be used on the screen systems. The doors can be hinged, attached with break-away connectors, foldable, rollable, or slidable. Equivalent types of doors will be known to those skilled in the art. Various types of door connectors and openers can also be used. As another example, it is envisioned that the apparatus could include automated features such as remote controllers for opening and closing the emergency discharge doors when needed.

We claim:

1. A screen system for removing debris from a flow channel, comprising:

(a) a screen frame having a porous bar grid that is located below an impermeable debris plate;

(b) a rake having a plurality of fingers that fit between bars of the bar grid, the rakes being movable along the bar grid to clear the bar grid of debris; and (c) an emergency discharge door located in the debris plate above the bar grid and above the normal water level in the channel, the emergency discharge door being movable from a normally closed position to an open position in the event water in the flow channel rises above the screen grid.

2. The screen system of claim 1 wherein the emergency discharge door is hinged to a scraper frame on an upper edge of the emergency discharge door.

3. The screen system of claim 1 further comprising a movable actuator member extending from the emergency discharge door for opening and closing the emergency discharge door.

4. The screen system of claim 1 wherein the emergency discharge door is mounted on a downstream side of the debris plate.

5. A screen system for removing debris from a flow channel, the screen system comprising:
   (a) a screen frame having a porous bar grid that is located below an impermeable debris plate;
   (b) a rake having a plurality of fingers that fit between bars of the bar grid, the rakes being movable along the bar grid to clear the bar grid of debris;
   (c) an emergency discharge door located in the debris plate above the bar grid, the emergency discharge door being movable from a normally closed position to an open position in the event water in the flow channel rises above the screen grid;
   (d) a hinge along an upper edge of the emergency discharge door, connecting the emergency discharge door to a downstream side of the debris plate;
   (e) lock brace mounted to the emergency discharge door for movement therewith;
   (f) lock bracket mounted to the downstream side of the debris plate for engagement with the lock brace when the emergency discharge door is in the closed position; and
   (g) a vertically oriented actuator member having a lower end that engages the lock brace and the lock bracket to secure them together, the actuator member being movable to release the lock brace and the lock bracket from each other.

6. The screen system of claim 5 wherein the lock brace and the lock bracket have mating holes and the actuator member has a pin that releasably inserts into the mating holes.

7. The screen system of claim 6 wherein the actuator member moves vertically to remove the pin from the mating holes.

8. A screen system for removing debris from a flow channel, comprising;
   (a) a screen frame having a porous bar grid that is located below a debris plate; a rake having a plurality of fingers that fit between bars of the bar grid, the rakes being movable along the bar grid to clear the bar grid of debris;
   (b) an emergency discharge door mounted on a downstream side of the debris plate above the bar grid, the emergency discharge door being movable from a normally closed position to an open position in the event water in the flow channel rises above the screen grid,
   (c) a hinge along an upper edge of the emergency discharge door, connecting the emergency discharge door to a downstream side of the debris plate;
   (d) a lock brace mounted to the emergency discharge door for movement therewith;
   (e) a lock bracket mounted to the downstream side of the debris plate for engagement with the lock brave when the emergency discharge door is in the closed position;
   (f) a vertically oriented actuator member having a lower end that engages the lock brace and the lock bracket to secure them together, the actuator member being movable to release the lock brace and the lock bracket from each other;
   (g) the lock brace and the lock bracket have mating holes and the actuator member has a pin that releasably inserts into the mating holes; and
   (h) the actuator member moves vertically to remove the pin from the mating holes.

9. The screen system of claim 8 further including a lever arm pivotably attached to the frame, wherein the actuator member is mounted to the lever arm so that rotating the lever arm causes vertical movement of the actuator member.

10. The screen system of claim 8 wherein the lock brace extends across a full width of the emergency discharge door and wherein the screen system further comprises:
    (a) a second lock bracket mounted to the emergency discharge door for movement therewith on a side of the emergency discharge door opposite the first mentioned lock bracket; and
    (b) a second actuator member having a lower end that engages the lock brace and the second lock bracket to secure them together, the second actuator member being movable in unison with the first mentioned actuator to release the lock brace and the second lock bracket from each other.

11. A method of filtering a fluid channel comprising the steps of installing in the fluid channel a screen system having an impermeable debris plate, a bar grid that is located below the debris plate, and a plurality of rakes having fingers that fit between bars of the bar grid, the method further comprising:
    (a) providing an emergency discharge door in the debris plate above the normal water level in the channel;
    (b) flowing a fluid through the screen system while the emergency discharge door is closed, whereby the bar grid filters debris from the fluid; and
    (c) opening the emergency discharge doors, if a level of fluid rises and flows over the debris plate due to blockage of the bar grid.

12. The method of claim 11 wherein the opening of the emergency discharge door is performed manually.

13. The method of claim 11 wherein the opening of the emergency discharge door is performed manually from an upper portion of the screen system.

* * * * *